(No Model.)

G. E. WILLSIE.
DISH PAN AND DRAINER.

No. 284,264. Patented Sept. 4, 1883.

Witnesses:
Joseph V. Moore
H. A. Stoltenberg

Inventor:
George E. Willsie,
By Thomas G. Orwig, Atty.

UNITED STATES PATENT OFFICE.

GEORGE E. WILLSIE, OF DES MOINES, IOWA, ASSIGNOR OF ONE-HALF TO H. L. CHAFFEE, OF SAME PLACE.

DISH PAN AND DRAINER.

SPECIFICATION forming part of Letters Patent No. 284,264, dated September 4, 1883.

Application filed June 12, 1883. (No model.)

*To all whom it may concern:*

Be it known that I, GEORGE E. WILLSIE, of Des Moines, in the county of Polk and State of Iowa, have invented a Dish Pan and Drainer, of which the following is a specification.

The object of my invention is to facilitate the washing, draining, and drying of dishes, and to prevent the dripping of dish-water and the annoyance and labor of wiping tables incident to the dripping of such greasy water.

It consists in forming a drainer integral with a dish-pan, as hereinafter fully set forth, in such a manner that dishes can be readily washed in the pan in a common way, and then lifted out of the water in the pan and placed upon the drainer without dropping water outside of the pan and drainer, and also in such a manner that all the water drained from the dishes will flow back into the pan.

Figure 1:
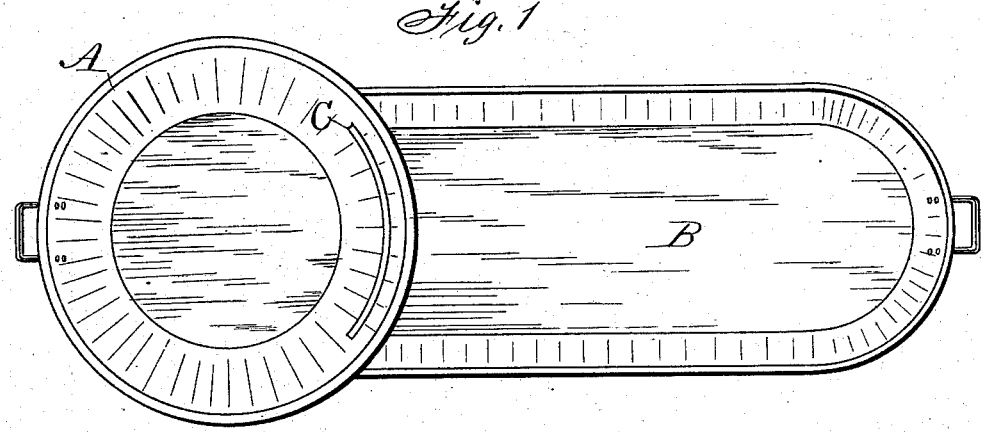
Figure 2:
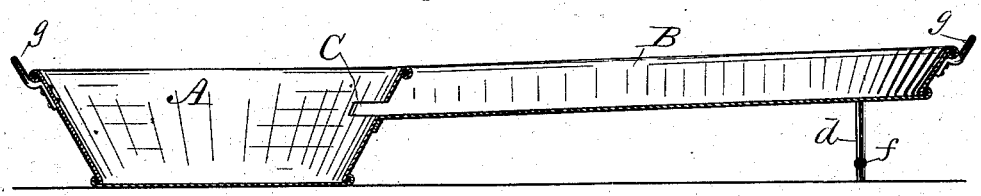
Figure 3:
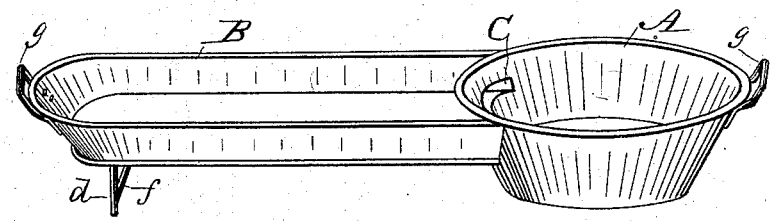

Figure 1 of my accompanying drawings is a top view, Fig. 2 a longitudinal section, and Fig. 3 a perspective view, of my dish pan and drainer combined. Together these figures clearly illustrate the construction, operation, and utility of my complete invention.

A represents a dish-pan of common form, that may vary in size as desired.

B is an elongated shallow draining-pan, rigidly joined to the side and top portion of the pan A by soldering, or in any suitable way, to produce water-tight joints. The bottom of the draining-pan B inclines toward the dish-pan A, and terminates at the lower edge of a horizontal slot, C, cut out of the rim or side of the pan A, or a line of perforations punched in the pan in lieu of the slot.

$d\ d$ represent feet fixed to the under side of the free end of the draining-pan B. They may vary in form as desired, and extend down level with the bottom of the dish-pan A, as required, to support the complete device level upon a kitchen-table or other suitable elevated base when in practical use.

$f$ is a brace connecting the legs $d$. When the device is not in use, it may be hung up against a wall by means of one of the handles, $g$, at its ends, and the brace $f$ can then be utilized as a towel-rack.

I am aware that a dish-drainer has been formed complete in itself, and adjustably and detachably connected with a dish-pan; but my manner of forming and combining a dish-drainer rigidly and permanently with a dish-pan of common form is novel and greatly advantageous.

I claim as my invention—

As an improved article of manufacture, a dish pan and drainer consisting of a deep pan of common form having an elongated slot or line of perforations in its side, and a shallow draining-pan having legs at its free end, rigidly and permanently joined to the side and upper portion of the dish-pan, so as to bring its bottom on a level with the slot or line of perforations in the dish-pan, and to operate in the manner set forth.

GEORGE E. WILLSIE.

Witnesses:
THOMAS G. ORWIG,
ERASTUS W. SMITH.